US010955629B2

(12) United States Patent
Scarlett

(10) Patent No.: US 10,955,629 B2
(45) Date of Patent: Mar. 23, 2021

(54) ONE-TO-MANY OPTICAL FIBER ARRAY STRUCTURES AND METHODS

(71) Applicant: Carol Y. Scarlett, Tallahassee, FL (US)

(72) Inventor: Carol Y. Scarlett, Tallahassee, FL (US)

( * ) Notice: Subject to any disclaimer, the term of this patent is extended or adjusted under 35 U.S.C. 154(b) by 0 days.

(21) Appl. No.: 16/632,120

(22) PCT Filed: Jul. 20, 2018

(86) PCT No.: PCT/US2018/043192
§ 371 (c)(1),
(2) Date: Jan. 17, 2020

(87) PCT Pub. No.: WO2019/018830
PCT Pub. Date: Jan. 24, 2019

(65) Prior Publication Data
US 2020/0225428 A1    Jul. 16, 2020

Related U.S. Application Data

(60) Provisional application No. 62/534,993, filed on Jul. 20, 2017.

(51) Int. Cl.
*G02B 6/42*    (2006.01)
*G02B 6/08*    (2006.01)

(52) U.S. Cl.
CPC .............. *G02B 6/4249* (2013.01); *G02B 6/08* (2013.01)

(58) Field of Classification Search
CPC ....................................................... G02B 6/08
See application file for complete search history.

(56) References Cited

U.S. PATENT DOCUMENTS

| 5,030,000 A | 7/1991 | Kanda |
| 5,430,816 A | 7/1995 | Furuya et al. |
| 6,400,875 B1 | 6/2002 | Lincoln et al. |
| 10,219,863 B2 * | 3/2019 | Yu .......................... A61B 18/24 |

(Continued)

FOREIGN PATENT DOCUMENTS

WO      WO-91/15785 A1    10/1991

OTHER PUBLICATIONS

Fey, Dietmar et al., "Parallel optical interconnects with mixed-signal OEIC and fibre arrays for high-speed communication." Proceedings of SPIE—The International Society for Optical A Engineering, Sep. 2004, pp. 1-13. [online] [retrieved on Sep. 13, 2018] <URL: https://www.researchgate.net/publication/228794386/download>.

(Continued)

*Primary Examiner* — Sung H Pak
(74) *Attorney, Agent, or Firm* — Marshall, Gerstein & Borun LLP

(57) ABSTRACT

An optical array formed from unclad fibers that are affixed with a micro-coating of adhesive has been developed to allow for enhanced light collection translating into parallel streams of optical output. The system is designed to be used for applications requiring parallel output streams (e.g. random number generation for parallel computing architectures, observation of position information for optical sensing application, etc.). The system acts as a parallel, pixeled detector for a source where the individual pixels are simultaneously readout.

19 Claims, 7 Drawing Sheets

(56) References Cited

U.S. PATENT DOCUMENTS

2005/0018993 A1   1/2005  Rolston et al.
2013/0155723 A1*  6/2013  Coleman .............. G02B 6/0018
                                                            362/621
2016/0341916 A1   11/2016 Meir et al.

OTHER PUBLICATIONS

International Search Report and Written Opinion for Application No. PCT/US2018/043192, dated Oct. 15, 2018.
International Preliminary Report on Patentability, corresponding International Application No. PCT/US18/43192, dated Jan. 21, 2020.
European Patent Application No. 18835363.5, Extended European Search Report, dated Feb. 9, 2021.

* cited by examiner

ONE-TO-MANY OPTICAL FIBER ARRAY STRUCTURES AND METHODS

CROSS-REFERENCE TO RELATED APPLICATIONS

This application is a national stage application of Application PCT/US18/43192, filed Jul. 20, 2018, which claims the priority benefit under 35 U.S.C. § 119(e) of U.S. Provisional Application No. 62/534,993, filed Jul. 20, 2017, the disclosures of each of which are incorporated herein by reference in their entirety.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Everyday more and more communication and computing systems rely on parallel signal input/output and processing architectures (e.g. Optical Sensing, High Performance Computing, Autonomous Vehicles, Autoencoders, etc.). To enable some form of parallelism, optical cables in an array type configuration may be designed to sample multiple special positions at one end and transmit information to other location.

A typical optical fiber is comprised of a core material, usually a glass; an outer coating known as a cladding, used to prevent leakage of the light outside of the core material; and a jacket, a plastic, usually colorful layer used to further prevent light loss. Currently, optical fiber arrays are built in various geometric configurations through simply affixing clad or both clad and jacketed fibers on one end. The cladding not only protects the fibers, it prevents the exchange of light between them. Such systems find application in optical sensors where the goal is to capture light from a source and transmit a distinct, position dependent pattern to a photodetector at some other position. However, cladding on individual fibers, which can measure 2-4 times the fiber core diameter (actual area where information can be captured), limits and diminishes the amount of information that can be gleaned from a given source.

Consequently, for some parallel applications, particularly those where exchange of information between fibers is not undesirable or can be mitigated, cladding and jacketing on the fibers diminishes the overall system effectiveness with little benefit.

SUMMARY OF THE INVENTION

The present application describes optical systems that can more efficiently capture optical data from an input beam and generate from that input beam a multitude of different parallel output beams each varying from each other, temporally and/or spatially, and thereby forming, in some embodiments, a parallel configuration optical randomness generator. The input beam can be a continuous beam or a pulsed beam. The input beam may be information carrying or not. Further the input beam may itself result from an upstream optical system producing a randomized energy as the input beam. In such examples, the optical system converts the random input beam into a plurality of random parallel output beams. In other examples, the input beam is not random, and the optical system generates the random parallel output beams.

In an embodiment, an optical system is provided. The optical system includes an optical fiber core array having a collection end, a transition region, and an output end, the optical fiber core array being formed of a plurality of optical fibers each having a core, a cladding, and a fiber jacket, the optical fiber core array being configured to receive an illumination beam at the collection end and convert the illumination beam into a plurality of spatially differentiated propagation beams propagating within the plurality of optical fibers. The collection end of the optical fiber core array consists of (i) the cores of the plurality of optical fibers organized in a fixed collection array having a collection plane for receiving an incoming illumination beam and (ii) a coating surrounding an outer surface of the collection array and extending the length of the collection end. The transition region extends from the collection end and comprises the cores of the plurality of optical fibers each surrounded by a respective cladding. The output end extends from the transition region and comprises the cores of the plurality of optical fibers each surrounded by the respective cladding and a respective fiber jacket for transmitting the illumination beam to a respective photodetector. The optical system also includes a plurality of photodetectors positioned to receive the illumination beam associated with one or more of the fiber cores.

In some embodiments, the coating is between 200-600 microns thick. In some embodiments, the coating is an adhesive. In some embodiments, the optical system includes a micro layer adhesive binding the cores to form a fixed collection array. In some embodiments, the optical system includes a plurality of optical couplers, each coupling one of the plurality of optical fibers to one of the plurality of photodetectors. In some embodiments, each of the plurality of photodetectors comprises an array of pixels. In some embodiments, the fixed collection array is a linear array. In some embodiments, the fixed collection array is a two-dimensional array. In some embodiments, the coating has a fixed refractive index along the length. In some embodiments, the coating has a varying refractive index along the length.

In another embodiment, a method is provided. The method includes receiving an illumination beam at the collection end of an optical fiber core array formed of a plurality of optical fibers each having a core, a cladding, and a fiber jacket, wherein the collection end of the optical fiber core array consists of (i) the cores of the plurality of optical fibers organized in a fixed collection array having a collection plane for receiving an incoming illumination beam and (ii) a coating surrounding an outer surface of the collection array and extending the length of the collection end. The method also includes converting the illumination beam into a plurality of spatially differentiated propagation beams propagating within the plurality of optical fibers; propagating the illumination beam to a transition region of the optical fiber core array, wherein the transition region extends from the collection end and comprises the cores of the plurality of optical fibers each surrounded by a respective cladding; and propagating the illumination beam to an output end of the optical fiber core array, wherein the output end extends from the transition region and comprises the cores of the plurality of optical fibers each surrounded by the respective cladding and a respective fiber jacket. The method also includes transmitting the illumination beam to a respective photodetector of a plurality of photodetectors positioned to receive the illumination beams associated with one or more of the fiber cores.

In some embodiments, the method includes transmitting the illumination beam received by the photodetector to a processing circuit for generating streams of optical randomness simultaneously. In some embodiments, the method includes sending up to hundreds of individual streams to distinct circuits for comparison to determine information about the incoming light quality and information. In some embodiments, the up to hundreds of output streams are separately sent for analysis or further use by up to hundreds of CPUs or GPUs simultaneously. In some embodiments, the up to hundreds of output streams carry randomized information for purposes of providing random number generation simultaneously. In some embodiments, the up to hundreds of output streams are compared to determine relative fluctuations for understanding the position information of the input source.

BRIEF DESCRIPTION OF THE DRAWINGS

The accompanying drawings, which are incorporated in and constitute a part of this disclosure, illustrate various embodiments of the present device. These drawings include.

DETAILED DESCRIPTION

Figure 1:
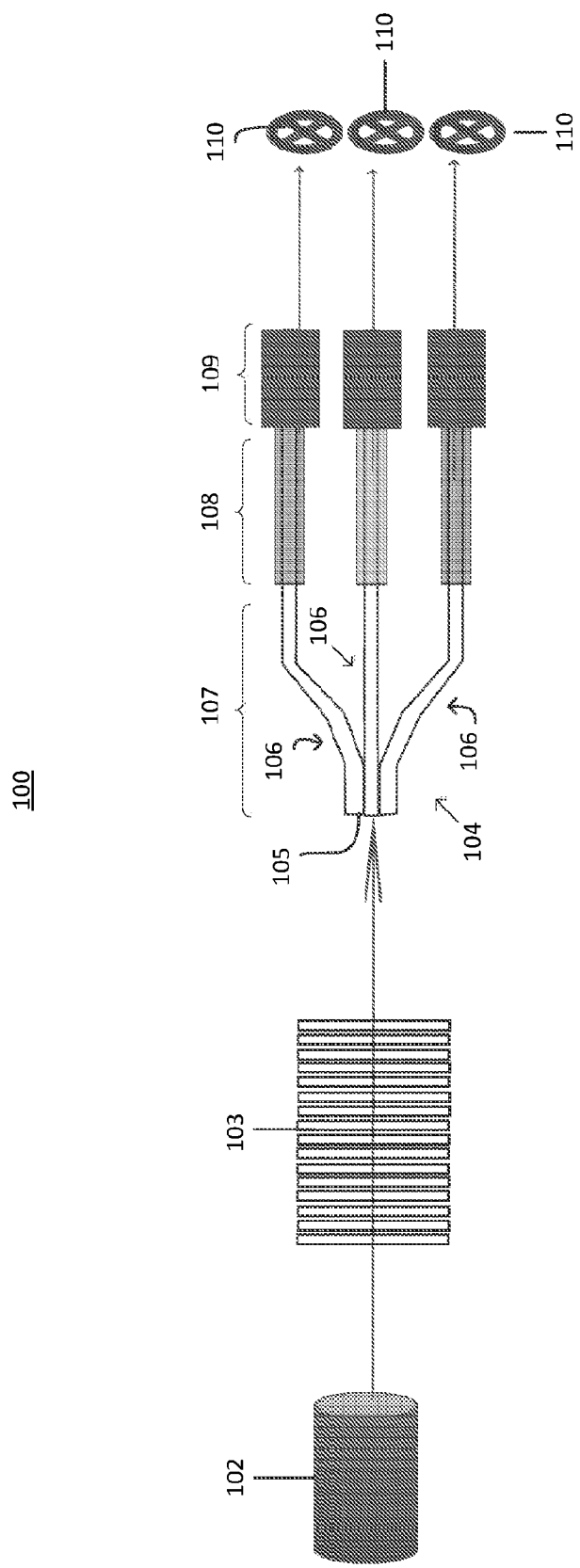
FIG. 1 is a schematic of an optical system, in accordance with an example.

The present techniques involve a series of affixed, unjacketed, unclad optical fiber cores in a tightly bound array at one end to capture and transmit incoming light from some illumination source into up to hundreds of individual streams. As used herein "light", "optical beam", "illumination beam", and "input beam" are used interchangeably and refer to any suitable photon beam energy, across any wavelength suitable for transmission through an optical fiber, including, by way of example, photon beam energy at infrared, visible, and/or ultraviolet wavelengths. The exiting light leaves jacketed, clad fibers on the transmission end of the optical fibers. For a single fiber, the "core" refers to the active region where light will enter and propagate through and is usually formed of a silicone glass structure. Fiber optics transmission of light is a well-established science with numerous communications applications and, more recently, optical detection applications. The use of fiber arrays for a plurality of optical outputs, especially where observation of position information from a plane of input is desired, has been demonstrated. These conventional devices, at their intended light collection end, are essentially affixed, jacketed, clad fibers with a low ratio of active area to overall array area. This leads to the significant loss of the available input optical information in both communication and optical sensing applications. Moreover, even the use of fully clad, jacketed fiber arrays may be significantly limited as the geometry of the input source may be physically small compared to the overall area presented by the fiber array including both the active (core) and inactive (jacket and cladding) portions of the array. An example of this mismatch between the dimensions of the input source and the arrangement of the collecting fibers can be seen in waveguides where regions are needed to fan out the light to multiple fibers.

The present application describes optical systems formed of unclad, unjacketed optical fibers (bare optical fiber cores) joined into a single array. An optical beam or image profile impinges, at some initial position (special plane), onto a surface composed of the bare optical fibers' cores that, on the collection end, have been cleaned of any jacket and cladding materials and placed flush against one another. Accordingly, the collection end is designed to allow "cross talk" of light between cores in order to induce or enhance randomization of the light. In particular, the number of cores and/or the length of the collection end may be selected such that there is sufficient cross talk to induce a randomization level above shot noise. For example, in an optical randomization system, the collection end induce randomization on an continuous illumination beam as that beam propagates through the collection end, resulting a plurality of a parallel random optical beams. The collection end enhances randomization if the illumination beam itself is generated by an optical randomizer, as described. The amount of randomization induced or enhanced by the collection end may be adjusted by adjusting the length of that end, i.e., as measured along a propagation axis. And the number of cores forming the collection end can be used to amount of randomization. Longer lengths result in greater randomization. More cores result in great randomization. In some examples, these one or both of these values are chosen to induce a level of randomization above 3× to 10× larger than shot noise.

In exemplary embodiments, each individual fiber's outer jacket and cladding are removed, so that just the bare core remains. The cores are glued together or otherwise affixed using an adhesive with optical properties similar to the original cladding materials to create a fiber core array, i.e., a single core from many cores. Accordingly, light can be transferred between the individual cores as it propagates along this section of unjacketed/unclad fiber, referred to as a collection end. That is, the transmission process may involve information exchange between cores due to the proximity of neighboring cores and the absence of any cladding or other material to prevent light leakage. In some applications, particularly those that involve production of randomized streams of numbers, the present techniques have a distinct advantage as the light leakage does not interfere with (and in fact improves) the desired process of distributing an initial light signal into multiple, even hundreds of streams all at once and for output to different readout circuitry.

On the opposite end, e.g., the output end, the cores have transitioned to individually clad fibers. That is, on the output end, from which light will emerge, the cladding (and/or the jacket) remain affixed on each individual fiber core so that the individual fibers will transmit some fraction of the total light collected on the unjacketed and unclad collection face. In some embodiments, the fiber core array can be simply some number of unjacketed and unclad fiber cores affixed by a thin, outer layer of glue, effectively re-cladding entire array at once, such that the resultant row of fiber cores measures approximately the number of layers multiplied by the core thickness. For example, if a fiber core is 0.25 mm in diameter, a row of 10 such fibers may measure 3.00 mm in length once the outer layer of glue has been applied. Advantageously, creating a fiber core array from unclad and unjacketed fiber cores provides a considerable increase in the ratio of useful (core) space to overall array size for capturing input light. In contrast, creating optical arrays from individually jacketed/clad fibers by affixing 10 jacketed/clad fibers would result in a row measuring as much as 9.00-30.00 mm in length but having only a collection area of 3.00 mm; thus there is considerable inefficiency due to the area taken up by the cladding and jacket. In such an example, the useful (core) space does not increase—giving a diminished light collecting capacity of a factor ×3-×10.

In example embodiments, the cores at the collection end form a one-dimensional or two-dimensional array. The cores, while maintaining their structure may be brought into physical contact with other cores, thereby allowing optical information exchange between cores in the collection end. The cores in the collection end are fixed relative to one another. To fix the cores, a gluing process may be used after the cores have been otherwise suspended parallel to one another. In other examples, the cores may be fusion bonded or affixed using other techniques. In the fusion bonded example, the cores do not maintain their structure in the collection end. Following the collection end, a transition region extends therefrom, between the collection end and the output end. The transition region may be formed of a cladding region, and the cores are no longer in contact with other cores and the cores are no longer in a fixed configuration in the transition region.

In embodiments, the cores, collection end, transition end, and output end can be stacked to form whatever pattern is desired to accommodate the dimensions of the optical input beam or other light sources.

In the collection end, for example, the unclad, unjacketed cores form a fixed collection array having a collection plane for receiving an incoming illumination beam. That fixed collection array may be a linear array or a two-dimensional array, for example. These bare optical fiber cores may be aligned into rows and the rows may be glued one atop the other to minimize the spacing between the useful (core) area or each fiber can be brought together in a 2×2 array before the entire system is affixed. In this second example, the array has fibers flushed against one another in 2-directions except where the fibers lie along the outer edges of the array. In some cases, the need to diminish the degree curvature introduced by affixing individual, bare optical fiber cores on one end into an array while maintaining separate fibers that are both clad and jacketed on the opposite end, may be accomplished through careful design and positioning of each core in the array space. This may be done by having some layers such that the unclad cores are not affixed in the same plane as the clad cores but rather offset to align in some other plane—see FIG. 2 for more details. The overall array size, relative curvature of individual fibers, total number of fiber cores used and other geometric parameters will vary as each array is designed to meet the specifics of a given optical input to output goal. Also, the relative size of the array and positioning of the bare optical fiber cores will lead to curvature of the fibers that must be reduced to prevent significant light loss. This factor determines the length of the bare fiber core region and length of the clad/jacketed regions.

In accordance with an example, a method for collecting as much light as possible from an array of optical fiber cores, formed from unjacketed and unclad fiber optical cables on one end, has been developed to maximize light collection. The other end of the array contains up to hundreds of jacketed, clad fiber cables enabling the streaming of hundreds of individual optical streams to distinct circuits simultaneously. The bare optical fiber cores are bundled as a single array whose dimensions are determined by the input light source. The bundle of fiber cores forming the input face of the array has a single cladding layer affixed to enclose the entire array to prevent light loss and to form a single light pipe at the collection end of the array. The other end of the array remains as jacketed and clad distinct fibers that can be used to send light signals to up to hundreds of individual circuits.

FIG. 1 illustrates use of an optical array system 100 showing an input beam or other source 102 along with a focal plane defined by the position of the entry plane to the array. The beam source 102 may be a non-coherent beam source such as, by way of example, an arc lamp, flashtube, electric spark, electrodeless lamp, excimer lamp, fluorescent lamp, high-intensity discharge lamp, hollow-cathode lamp, induction lighting, neon lamp, and argon lamp, plasma lamp, Xenon flash lamp, a bulb using various filaments or gases, and even sunlight. Furthermore, the beam source may impinge upon any number of materials before reaching the optical array. In other examples, including that illustrated, the beam source 102 may be a coherent beam source, such as a Diode laser, a VCSEL array, or a laser utilizing gas tubes, solid-state structures, fiber optics, photonic crystals, semiconductors, dyes, free-electrons or other exotic media, whether operated continuously (CW) or pulsed (q-switched, mode-locking or pulse pumping).

The beam source 102 may produce beam emissions in the visible, near infrared, mid infrared, long infrared, violet, or other suitable spectrum regime. Moreover, in some examples, the beam source may include beam emissions over a plurality of wavelengths components, where each wavelength component may be separately randomized by the optical system, for example, when using multiple different photodetectors.

In the illustrated example, the optical array system is implemented as an optical randomizer that produces a plurality of parallel random output beams, each output beam being entirely random from each other output beam.

The beam source 102 produces a beam incident on a birefringent medium 103 configured to produce a randomized energy from the beam, which in turn impinges upon a fiber array 104. An example implementation of the birefringent medium is described in U.S. Pat. No. 9,971,568, entitled "Generation of random numbers through the use of quantum-optical effects within a mirror cavity system" filed on Mar. 3, 2016, along with other example configurations for generating an optical beam for randomization, the entire specification of which is hereby incorporated by reference. The birefringent medium 103 includes birefringent materials with alternating direction for their respective birefringent axis. In this example, the optical array system converts the random input beam into a plurality of random parallel output beams.

However, in other examples, the optical array system 100 does not include a birefringent medium 103. Accordingly, in such examples, the input beam is not random, and the optical array system generates the random parallel output beams. That is, due to the presence of multiple fiber cores that are, on the collection end, in contact with some of the other fiber cores, there will be exchange of photonic energy between the cores giving rise to effect that generate additional noise as the beam traverses from the collection end of the array to the transmission end. Because of this "cross-talk" between fiber cores, the light exiting the collection end and transiting to the individual (cladded and subsequently cladded and jacketed) fibers will have an increased "randomization" of its optical properties. Thus, even in the absence of a randomizing volume 103, the optical fiber array as described could serve to increase the entropy of an optical beam beyond the usual noise (e.g. shot noise) and thereby generate hundreds of enhanced entropy streams, that is, hundreds of parallel random optical beams. The configuration of hundreds of optical fibers makes this increased entropy appropriate for feeding hundreds of random output beams to hundreds of CPUs, GPUs or other optical circuits. These processing systems can then collect these random optical beams and generate random numbers, e.g., by collecting the random optical beams over a suitable time window. Thus, the system as described can act to provide randomness, in some example implementation. As discussed herein the system may be used as well for piping information about a beam profile from of an incoming beam, and whether the beam profile exhibits spatial position anomalies, such as asymmetries.

In any case, the random or not random input beam is incident upon an optical array of completely unclad, affixed fiber cores of fibers 106 (only some of which are shown for example purposes) that are part of an optical fiber core array and at a collection end 107 forming a fixed collection fiber array 104 defining a collection plane 105 as the array surface. The input beam is introduced onto the array surface impinging at a non-90° angle to the plane 105. That is, in some examples, the incident beam impinges on the array 104 at non perpendicular angles depending on the desired angle of observation.

The size of the array 104, e.g., the number of fiber cores 106, may be increased or decreased according to the dimensions of the input source to be observed. Furthermore, the fiber cores in the array 104 may be affixed together using a thin layer of glue so that the glue forms a micro-coating around the entire bare optical fiber core array 104; such that the array acts as a single light pipe on the input end.

Figure 6A:
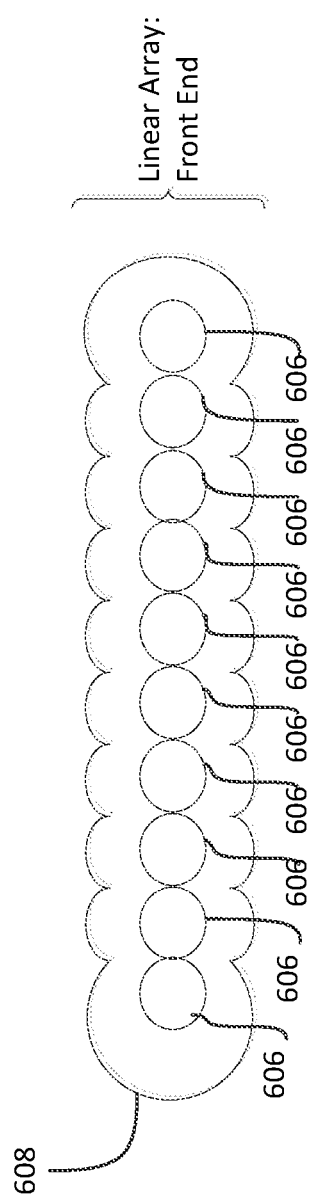
FIG. 6A illustrates an example of the front end of a linear fiber core array, in accordance with an example.
Figure 6B:
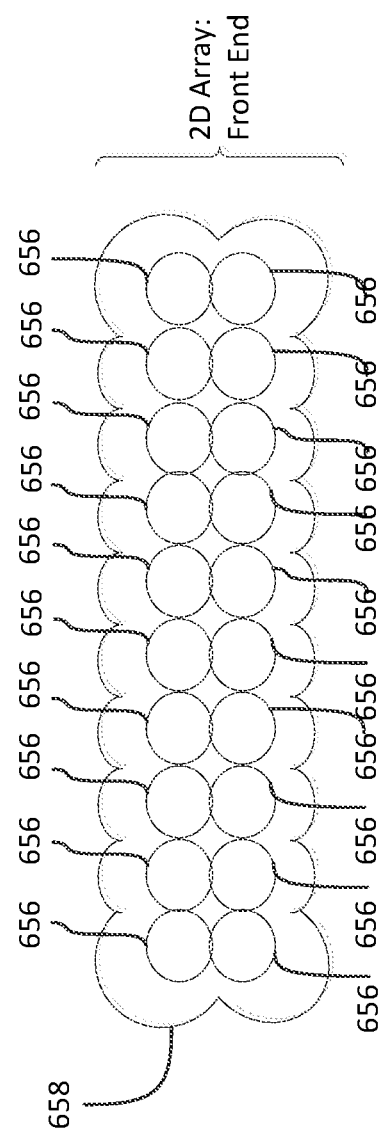
FIG. 6B illustrates an example of the front end of a two-dimensional fiber core array, in accordance with an example.

In some examples, and as shown in FIGS. 6A and 6B the cores come in direct contact with at least one other core in collection end 107. As such, in some examples, adhesion is achieved by an external micro-coating around the entire array, instead of an adhesive that surrounds each individual core. In some such examples, the illumination beam propagates along the fiber cores, where due to contact between the cores the beam energy may shift from one core to another. As the illumination beam propagates down the cores, the cores physically separate from one another in a distal portion 111 of the collection end 107, and connect to a transition region 108 that transitions from the collection end 107 of the fiber to an output end 109. In the distal portion 111, the cores of the fibers 106 may remain fixed relative to one another or they may movable relative to one another, example where the connection end meets the transition region.

An external micro-coating may effectively reduce light losses from the fiber core array, enabling more efficient collection but possibly diminishing position sensitivity data to be captured. Thus, the array 104 captures light directly onto a system of unclad, affixed fiber cores that may include a layer of glue surrounding the array and with a differing refractive index from the fiber cores, comprising the active collective region.

In some embodiments, the micro-coating can have a fixed refractive index along the length of the collection end 107. In some embodiments, the micro-coating has a varying refractive index along the length.

Figure 2:
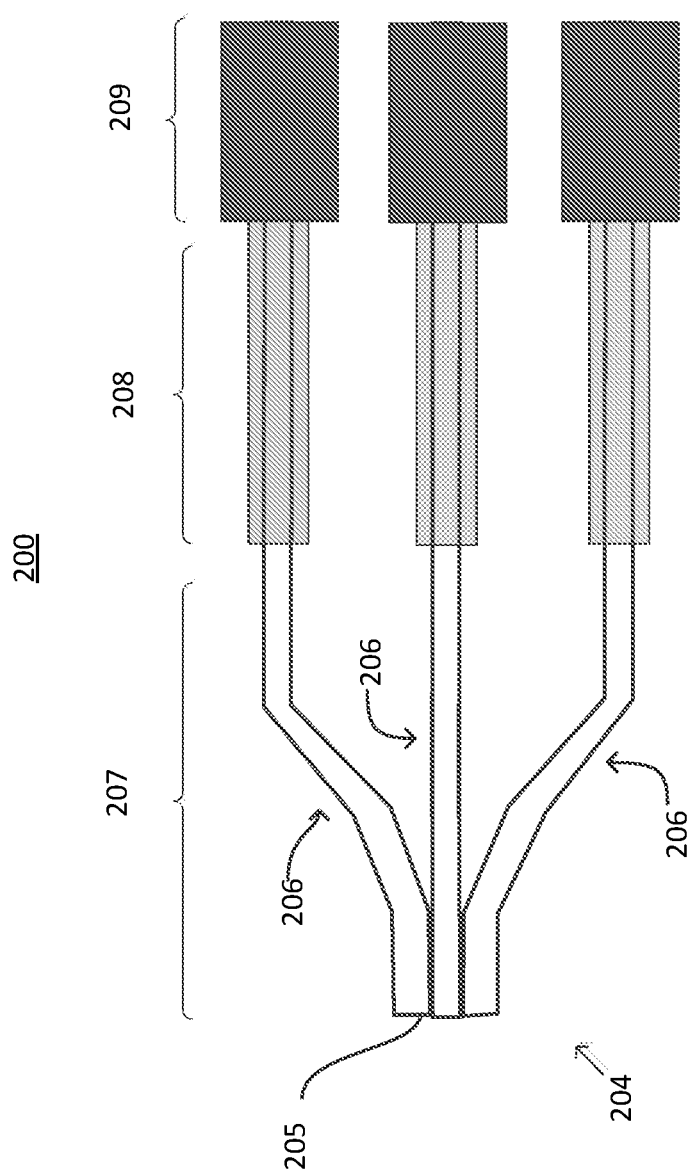
FIG. 2 is a schematic of a fiber core array used in an optical system, in accordance with an example.

FIG. 2 illustrates a system 200 of optical fiber cores 206 (only a representative number of which are shown) forming a bar fiber core array 204 formed of bare cores affixed together using a single layer of micro-coating (e.g., glue or other adhesive) that provides structural rigidity and optical confinement. Upon entry into the array at a collection plane 205, the input beam propagates from a collection end 207 (that is unclad and unjacketed) of the fibers 206 to a transition region 208 that is a cladded portion of the fibers 206.

The transition region 208 may be formed of a combination of varying types of cladding materials, including industry standard cladding materials that may include additional protective wrapping as seen in other optical communication fibers. The fibers 206 may be coated with several materials ranging in thickness to both protect the core and decrease exchange of information (cross-talk) between individual fibers. The clad fibers 206 may be further protected against bending that could damage the cores by additional surrounding materials (e.g., jacketing) at output end 209.

The fibers 206 carry optical signals to detection elements 110 further upstream, as shown in FIG. 1. The fibers 106 at the output end 109 may be coupled to these detection elements through a plurality of optical couplers each coupling one or more fibers to one or more detection elements. In some embodiments, the detection elements 110 are photodetectors, such as an array of pixels.

As shown, the input beam may be collected with the fiber array 104, 204, transmitted along micro-coated portions 107, 207, to a region 108, 208 where the original cladding is present, and finally to the fully clad and jacketed portions 109, 209 separating fibers 106, 206 for transmission to detection circuitry.

The resulting output beam is directed to one or more photodetectors 110, such an array of photodetectors, or a plurality of or other circuitry for detection and use in various applications.

In exemplary embodiments, those applications include generation of random numbers, for example, as described in the example of FIG. 7 below.

In other exemplary embodiments, applications include detecting asymmetries in an optical profile (e.g., detecting a pattern to the left of center as distinct from the pattern as seen at the same displacement to the right of center, i.e., a spatial asymmetry). While the transfer of beam energy between cores at the collection end may produce noise, depending on the scale of an asymmetry, that asymmetry may be measureable by a photodetector 110 at the end of one of the fibers from the output end. This asymmetry may be measured by comparing the outputs of two or more different fibers (i.e., the output of corresponding photodetectors) and comparing those outputs to identify asymmetries or other physical position or wavelength anomalies occurring at the entrance of the optical fiber core array (e.g., at the collection plane). These asymmetry applications may be used to assess differences in the number of photons, wavelengths of emitted output beams, or other qualities over an output beam profile.

Figure 3A:
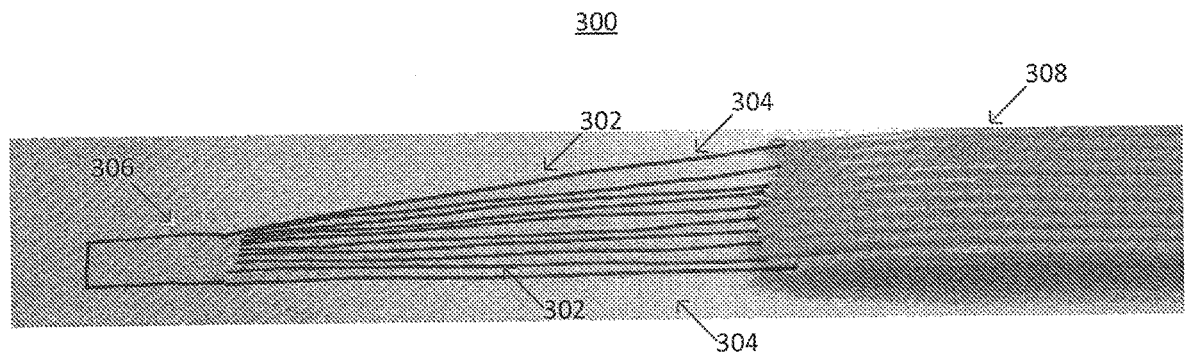
FIGS. 3A and 3B are schematics of a fiber core array, illustrating how a row of unclad, unjacketed fiber cores are affixed to form a single fiber core array, in accordance with an example.
Figure 3B:
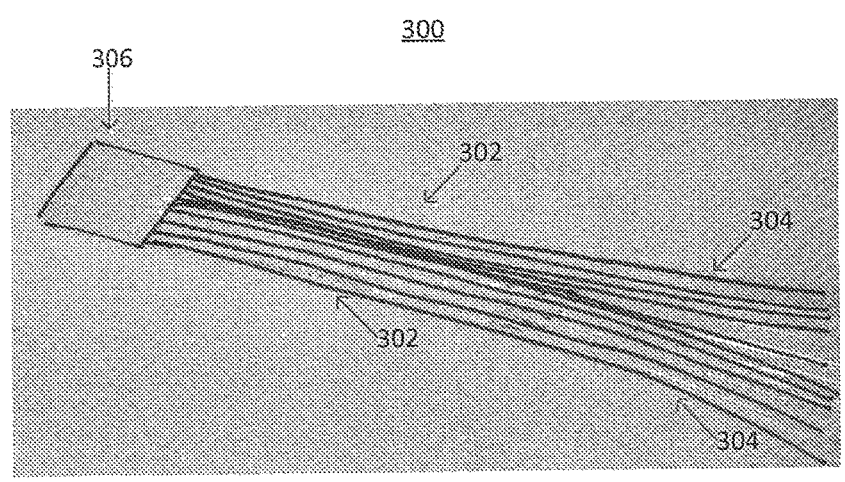

FIGS. 3A and 3B depict example fiber core array 300 configured to capture parallel streams of an in illumination beam. Optical fibers 302 have been stripped of cladding 304 and arranged to form the single, compact linear area at a collection end 306, while those fibers have their cladding and jackets at an output end 308.

Figure 4:
FIG. 4 is a schematic of two-dimensional (e.g., a square) fiber core array consisting of 10 rows, each of 10 fiber cores, stacked and affixed together, in accordance with an example.

FIG. 4 is an illustration of an example fiber core array having square array having 10 rows, each row formed of 10 uncladded fiber cores, stacked and affixed together. As shown, the stripped, mounted rows are stacked together to form arrays of glass fibers for collecting an incoming light on one end and parallel piping it of collected output light on the other end.

Figure 5:
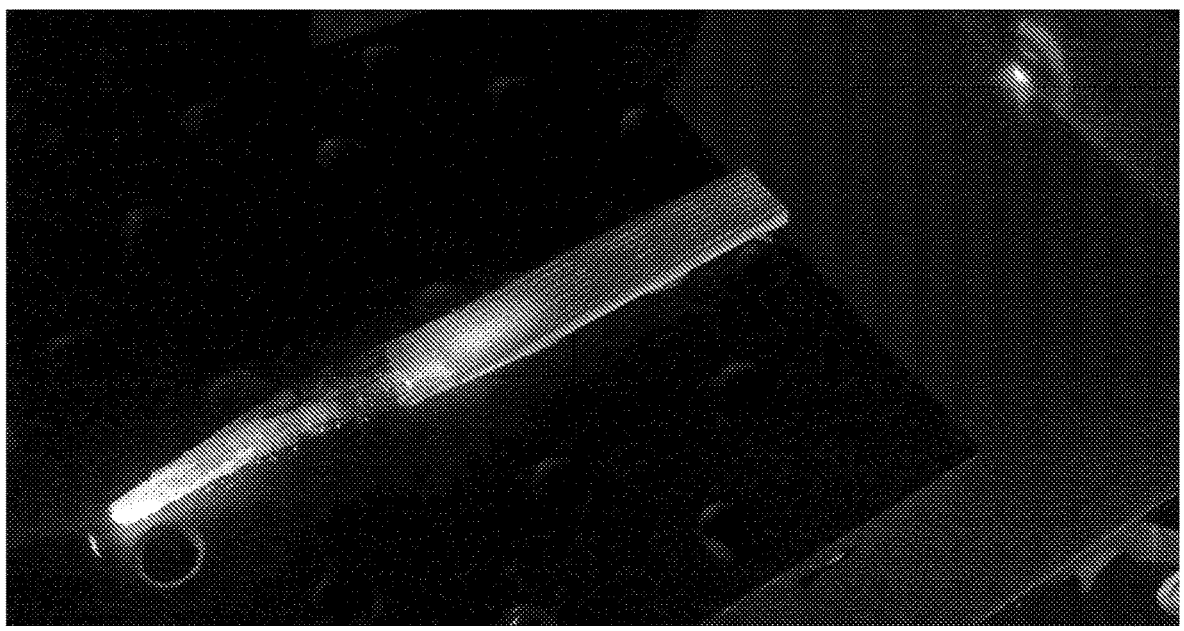
FIG. 5 illustrates how light enters from the unclad fiber cores at one end and are transmitted through the clad fibers on the opposite end, in accordance with an example.

FIG. 5 is an illustration of another example of light entering the unclad fiber cores at one end and transmitting through the clad fibers on the opposite end. As shown in FIG. 4, light is collected from a source impinging onto the unclad bundle. The light is transmitted down the length of the fibers, for individual observation by a detection element. At the far end, the clad fibers may be used to input light onto other circuitry such as, e.g., the photodetectors 110 shown in FIG. 1.

FIG. 6A illustrates an example of the collection plane (of a collection end) of a linear fiber core array (such as, e.g., fiber core array 104 or 204). As illustrated in FIG. 6A, a linear row of bare fiber cores 606 are flush with one another, and the entire array of bare fiber cores 606 is affixed at the exterior with a micro-coating 608 (not drawn to scale) that may function as a cladding. The micro-coating can be formed from any number of known adhesives, (e.g. gorilla glue) that harden and form a shell, effectively trapping the fibers to prevent the array from falling apart. In some embodiments in which the fibers are fused, a non-adhesive coating with a lower refractive index may be used in place of an adhesive.

FIG. 6B illustrates an example of the front end (i.e., the collection end) of a two-dimensional fiber core array (such as, e.g., fiber core array 104 or 204). As illustrated in FIG. 6A, two rows of bare fiber cores 656 are placed flush with one another, and the entire array of bare fiber cores 656 is affixed at the exterior with a glue or cladding material 658 (not drawn to scale).

Figure 7:
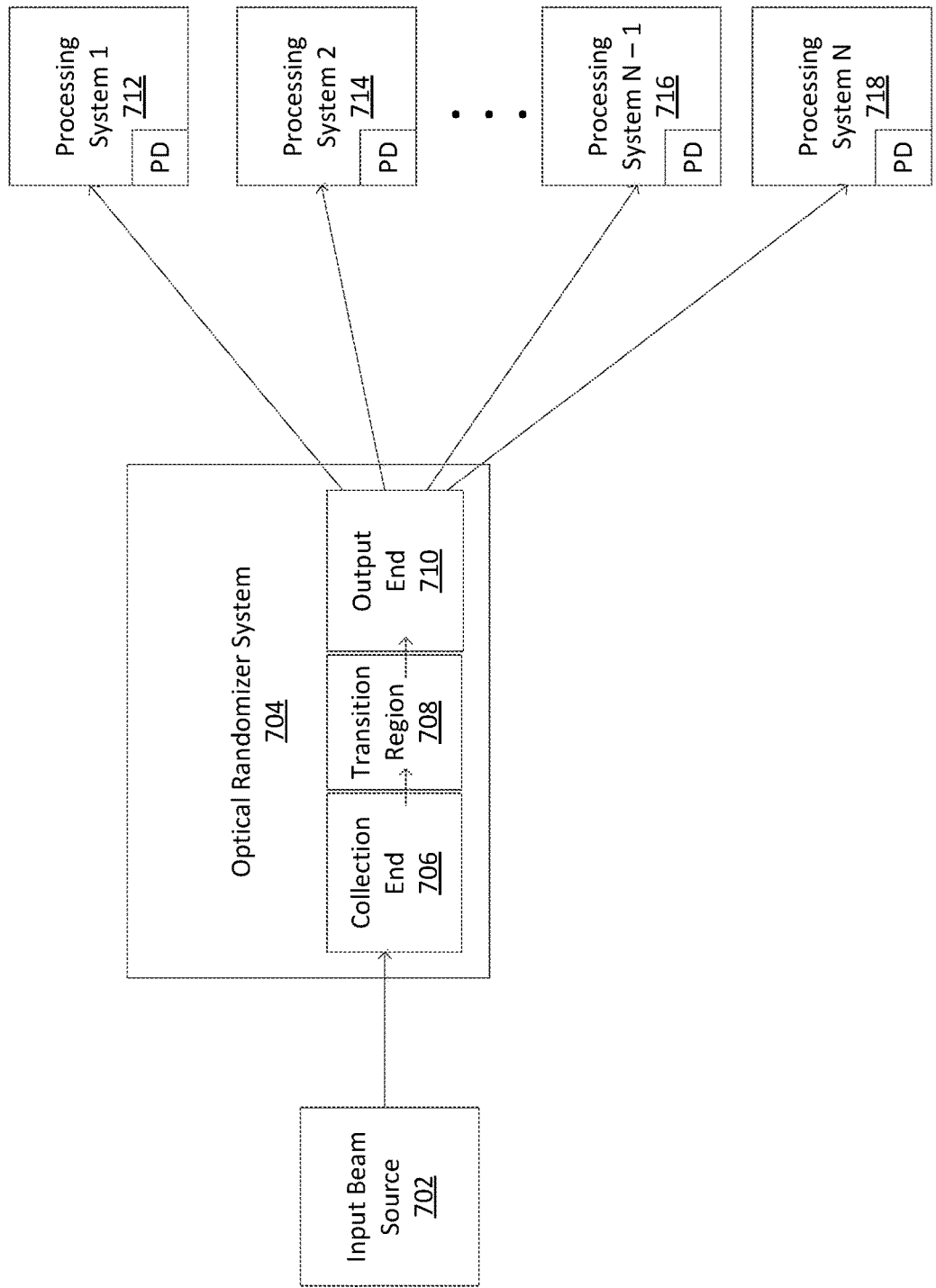
FIG. 7 illustrates a block diagram of an optical system, in accordance with an example.

FIG. 7 illustrates an example block diagram of an optical system 700. As discussed above, an input beam source 702 (e.g., beam source 102) may generate an input beam that impinges upon an optical randomizer system 704. The optical randomizer system includes a fiber core array having a collection end 706, a transition region 708, and an output end 710. At the collection end 706, a plurality of bare fiber cores (e.g., of fibers 106, 206), stripped of their original cladding and jacketing, are affixed together with a coating surrounding an outer surface of the collection array and extending the length of the collection end to form a fiber core array (e.g., fiber core array 104). The collection end 706 of the fiber core array receives a beam from the beam source 702 via a collection plane. As the input beam from the input beam source 702 impinges on the collection end 706 and propagates through the fiber core array, the beam becomes randomized due to the random transfer of light between fiber cores due to the lack of cladding, forming random parallel output beams which propagate into the transition portion 708. At the transition portion 708, which extends from the collection end, the fiber core array is separated into individual fiber cores, which are each individually cladded. At the output end 710, which extends from the transition region 708, the individually cladded fiber cores are each jacketed for transmitting the random parallel output beams to one or more photodetectors (shown as "PD") of the optical randomizer system 704.

Accordingly, the optical randomizer system 704 generates a randomized energy that is characterized by random statistical noise (at a level of the square-root of the number of photons emerging), as well as random beam energy on the scale proportional to the number of photons. The beam energies fluctuate between 0 and a maximum value. To convert this optical randomized energy to a randomized digital signal, each fiber of the output end 710 may be coupled to one or more processing systems 712, 714, 716, 718. In some embodiments, these processing devices 712, 714, 716, 718 may be achieved as processors embedded within a photodetector, such as a readout circuit or other processor. In other examples, the processing devices 712, 714, 716, 718 may be separate devices such a desktop computers, laptop computers, workstations, or the like, each having a photodetector of couple to one. In some examples, processing devices 712, 714, 716, 718 may be coupled to the photodetector through a wired or wireless connection. In some examples, processing devices 712, 714, 716, 718 may be coupled to photodetectors through a communications network, where for example, the processing devices 712, 714, 716, 718 may be located remotely on a server or other location. The processing systems 712, 714, 716, 718 may each be implemented as central processing units (CPUs), graphical processing units (GPUs) or any other parallel computing architecture, for example.

The pixel array of the photodetector receives the randomization energy from the optical system 704 and each pixel produces a digital output signal, either a "1" or a "0". Each pixel produces an output signal in parallel, such that collectively the pixels produce parallel pixel output signals. These parallel pixel output signals may be produced continuously or each read cycle of the corresponding photodetector. Collectively these parallel pixel output signals form a parallel randomized output signal of the corresponding photodetector. A 12×12 pixel array, for example, if entirely illuminated by the randomization energy could produce a maximum of 144 parallel output signals, that is a parallel randomized output signal formed of 144 different values, which a processing device 712, 714, 716, 718 may then convert into a random number of N bits, where N is equal to or less than 144, e.g., 128 bits.

The energy of the outgoing beam is electronically recorded and converted into a series of "1" and "0" bits which are recorded by the processing devices. The processing devices 712, 714, 716, 718 then will generate a random number of N bits in length from the values recorded by the pixels of the photodetector. That bit length N may be the same as the number of pixels of the photodetector or it may be some subset of the total number of pixels. In some examples, N is an integer number equal to $2^n$ (2, 4, 8, 16, 32, 64, 128, 256, etc.). The random number is then stored on one or more non-transitory, computer readable memories of the processing devices 712, 714, 716, 718. The processing devices 712, 714, 716, 718 herein may include one or more processes, one or more memories storing instructions executable by the one or more processors. These processing devices 712, 714, 716, 718 may include input/output connectors for connecting to peripherals such as input devices (keyboards, keypads, etc.), displays, as well as to portable devices and other processing devices. The processing devices 712, 714, 716, 718 may include network interfaces for coupling to communication networks through wired or wireless communications. The processing devices 712, 714, 716, 718 can access the photodetectors at any desired time and obtain a new random number, especially in the case of a CW operated beam source, as the randomization changes continuously. It will be appreciated that the photodetector may buffer its readout so as to store the detected randomization pixel values in a memory that may be accessed by the processing devices 712, 714, 716, 718. The techniques herein can also be implemented as special purpose logic circuitry, e.g., an FPGA (field programmable gate array) or an ASIC (application specific integrated circuit), by way of further examples. Processors suitable for the execution of a computer program include, by way of example, both general and special purpose microprocessors, and any one or more processors of any kind of digital computer. Generally, a processor will receive instructions and data from a read only memory or a random access memory or both. A computer will include a processor for performing instructions and one or more memory devices for storing instructions and data. Generally, however, a computer may also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

By using a pixelated photodetector to capture the energy output, the random distribution can provide a parallel set of bits for use in encryption of sensitive information, simulations of noise (e.g. in Monte Carlo simulations of various systems), and any application requiring random number generation. That is, each pixel corresponds to a different bit that is random. Therefore, each bit of the N-bit random number is truly random.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connects the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of the example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but also deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but also deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as an example only and does not describe every possible embodiment, as describing every possible embodiment would be impractical, if not impossible. One could implement numerous alternate embodiments, using either current technology or technology developed after the filing date of this application.

What is claimed is:

1. An optical system comprising:
an optical fiber core array having a collection end, a transition region, and an output end, the optical fiber core array being formed of a plurality of optical fibers each having a core, a cladding, and a fiber jacket, the optical fiber core array being configured to receive an illumination beam at the collection end and convert the illumination beam into a plurality of propagation beams propagating within the plurality of optical fibers and output at the output end;
wherein the collection end of the optical fiber core array consists of (i) the cores of the plurality of optical fibers organized in a fixed collection array having a collection plane for receiving an incoming illumination beam and (ii) a coating surrounding an outer surface of the collection array and extending the length of the collection end;
wherein the transition region extends from the collection end and comprises the cores of the plurality of optical fibers each surrounded by a respective cladding;
wherein the output end extends from the transition region and comprises the cores of the plurality of optical fibers each surrounded by the respective cladding and a respective fiber jacket for transmitting the illumination beams as a plurality of parallel output beams; and
a plurality of photodetectors positioned to receive the plurality of parallel output beams, wherein each of the plurality of photodetectors comprises an array of pixels.

2. The optical system of claim 1, wherein the coating is between 200-600 microns thick.

3. The optical system of claim 2, wherein the coating is an adhesive.

4. The optical system of claim 1, further comprising a micro layer adhesive binding the cores to form fixed collection array.

5. The optical system of claim 1, wherein the fixed collection array is a linear array.

6. The optical system of claim 1, wherein the fixed collection array is a two-dimensional array.

7. The fiber core array optical system of claim 1, wherein the coating has a fixed refractive index along the length.

8. The optical system of claim 1, wherein the coating has a varying refractive index along the length.

9. The optical system of claim 1, further comprising:
a plurality of processing devices each coupled to one or more of the plurality of photodetectors, wherein each processing device comprises one or more processors and one or more memories storing instructions that when executed cause the one or more processors to:
detect one or more of the plurality of parallel output beams; and
produce an electrical signal based on the detected one or more of the plurality of parallel output beams.

10. The optical system of claim 1, wherein each produced electrical signal is a random signal.

11. The optical system of claim 10, wherein each produced electrical signal is an optical asymmetry signal or a spatial asymmetry signal.

12. The optical system of claim 9, wherein the one or more memories store instructions that when executed cause the one or more processors to detect one or more of the plurality of parallel output beams in response to a control signal.

13. The optical system of claim 1, wherein the optical fiber core array comprises at least 10 optical fibers.

14. The optical system of claim 1, wherein the optical fiber core array comprises at least 100 optical fibers.

15. A method comprising:
- receiving an illumination beam at a collection end of an optical fiber core array formed of a plurality of optical fibers each having a core, a cladding, and a fiber jacket,
- wherein the collection end of the optical fiber core array consists of (i) the cores of the plurality of optical fibers organized in a fixed collection array having a collection plane for receiving an incoming illumination beam and (ii) a coating surrounding an outer surface of the collection array and extending the length of the collection end;
- converting the illumination beam into a plurality of propagation beams propagating within the plurality of optical fibers;
- propagating the illumination beam to a transition region of the optical fiber core array, wherein the transition region extends from the collection end and comprises the cores of the plurality of optical fibers each surrounded by a respective cladding;
- propagating the illumination beam to an output end of the optical fiber core array, wherein the output end extends from the transition region and comprises the cores of the plurality of optical fibers each surrounded by the respective cladding and a respective fiber jacket for transmitting the illumination beams as a plurality of parallel output beams; and
- transmitting each of the plurality of parallel output beams to a respective photodetector from a plurality of photodetectors positioned to receive the illumination beams wherein each of the plurality of photodetectors comprises an array of pixels.

16. The method of claim 15, further comprising:
- detecting, by a plurality of processing devices each coupled to one or more of the plurality of photodetectors, one or more of the plurality of parallel output beams; and
- producing, by each of the plurality of processing devices, an electrical signal based on the detected one or more of the plurality of parallel output beams.

17. The method of claim 16, wherein each produced electrical signal is a random signal.

18. The method of claim 16, wherein each produced electrical signal is an optical asymmetry signal.

19. The method of claim 16, further comprising: comparing a plurality of the produced electrical signals to one another to produce the optical asymmetry signal, wherein the optical asymmetry signal is an indication of position information of the illumination beam received at the collection end.

* * * * *

UNITED STATES PATENT AND TRADEMARK OFFICE
CERTIFICATE OF CORRECTION

PATENT NO. : 10,955,629 B2
APPLICATION NO. : 16/632120
DATED : March 23, 2021
INVENTOR(S) : Carol Y. Scarlett Page 1 of 1

It is certified that error appears in the above-identified patent and that said Letters Patent is hereby corrected as shown below:

In the Claims

At Column 14, Line 47, Claim 7: "array optical" should be -- array of optical --.

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*